US012752989B2

(12) United States Patent
De La Vega Sudan et al.

(10) Patent No.: US 12,752,989 B2
(45) Date of Patent: Oct. 6, 2026

(54) FILMS WITH RETORT-SHOCK RECOVERY

(71) Applicant: AMCOR FLEXIBLES NORTH AMERICA, INC., Neenah, WI (US)

(72) Inventors: Leticia De La Vega Sudan, Londrina (BR); Scott J. Kelly, Kimberly, WI (US)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 270 days.

(21) Appl. No.: 16/496,582

(22) PCT Filed: Mar. 31, 2017

(86) PCT No.: PCT/US2017/025496
§ 371 (c)(1),
(2) Date: Sep. 23, 2019

(87) PCT Pub. No.: WO2018/182712
PCT Pub. Date: Oct. 4, 2018

(65) Prior Publication Data
US 2020/0108987 A1 Apr. 9, 2020

(51) Int. Cl.

| | |
|---|---|
| ***B65D 65/40*** | (2006.01) |
| ***B32B 7/12*** | (2006.01) |
| ***B32B 27/08*** | (2006.01) |
| ***B32B 27/30*** | (2006.01) |
| ***B32B 27/32*** | (2006.01) |
| ***B32B 27/34*** | (2006.01) |

(Continued)

(52) U.S. Cl.
CPC ................ *B65D 65/40* (2013.01); *B32B 7/12* (2013.01); *B32B 27/08* (2013.01); *B32B 27/306* (2013.01); *B32B 27/32* (2013.01); *B32B 27/34* (2013.01); *B65D 75/008* (2013.01); *B65D 75/26* (2013.01); *B32B 2250/05* (2013.01); *B32B 2250/24* (2013.01); *B32B 2307/514* (2013.01); *B32B 2307/7244* (2013.01); *B32B 2439/46* (2013.01); *B32B 2439/70* (2013.01)

(58) Field of Classification Search
CPC ......... B32B 1/02; B32B 27/306; B32B 27/32; B32B 27/34; Y10T 428/1352; Y10T 428/31855; Y10T 428/31725
USPC ................................................ 428/35.9, 35.7
See application file for complete search history.

(56) References Cited

U.S. PATENT DOCUMENTS 4,352,850 A 10/1982 Yamamoto et al.
4,999,229 A 3/1991 Moritani et al.
5,035,851 A 7/1991 Schirmer
(Continued)

FOREIGN PATENT DOCUMENTS

CA 2028393 A1 5/1991
CN 101594992 A 12/2009
(Continued)

OTHER PUBLICATIONS

Soarnol Technical Data Sheet, Mar. 8, 2013.*

*Primary Examiner* — Seth Dumbris

(57) ABSTRACT

A multilayer barrier film for food packaging comprises an outer layer comprising a retortable grade ethylene vinyl alcohol (EVOH) copolymer; a sealing layer; and one or more inner layers located between the outer layer and the sealing layer. Excellent recovery of oxygen barrier post heat processing is achieved by these films and retortable containers made therefrom.

10 Claims, 5 Drawing Sheets

(51) Int. Cl.

| | |
|---|---|
| ***B65D 75/00*** | (2006.01) |
| ***B65D 75/26*** | (2006.01) |

(56) References Cited

U.S. PATENT DOCUMENTS

| | | | |
|---|---|---|---|
| 6,773,775 | B2 | 8/2004 | Inoue et al. |
| 7,834,089 | B2 * | 11/2010 | Zhang ................. C08L 23/0853 525/57 |
| 8,075,964 | B2 | 12/2011 | Mueller et al. |
| 8,252,396 | B2 | 8/2012 | Mueller et al. |
| 8,551,590 | B2 | 10/2013 | Nakashima et al. |
| 8,945,702 | B2 | 2/2015 | Wuest et al. |
| 9,174,408 | B2 | 11/2015 | Shah et al. |
| 9,447,269 | B2 * | 9/2016 | Walther .................. B32B 27/32 |
| 9,452,575 | B2 | 9/2016 | Urushidani et al. |
| 2003/0017352 | A1 * | 1/2003 | Dayrit ...................... A23B 2/20 428/476.3 |
| 2004/0037983 | A1 | 2/2004 | Reighard et al. |
| 2005/0085785 | A1 | 4/2005 | Shang et al. |
| 2005/0118374 | A1 * | 6/2005 | Douglas .................. B32B 27/34 264/173.14 |
| 2007/0092744 | A1 | 4/2007 | Di Tella et al. |
| 2008/0113130 | A1 | 5/2008 | Schell et al. |
| 2011/0027428 | A1 | 2/2011 | Bekele |
| 2011/0039098 | A1 | 2/2011 | Forloni et al. |
| 2011/0318589 | A1 * | 12/2011 | Pignatelli ................ B32B 27/18 428/461 |
| 2012/0009305 | A1 | 1/2012 | Hausmann et al. |
| 2016/0067950 | A1 | 3/2016 | Fischer et al. |

FOREIGN PATENT DOCUMENTS

| | | | |
|---|---|---|---|
| EP | 0399113 | A1 | 11/1990 |
| EP | 2862898 | A1 | 4/2015 |
| WO | 2006094733 | A1 | 9/2006 |
| WO | 2013041469 | A1 | 3/2013 |

* cited by examiner

FILMS WITH RETORT-SHOCK RECOVERY

TECHNICAL FIELD

The present disclosure relates to films for retort applications. The films have multiple layers. The outer layer comprises an ethylene-vinyl alcohol ("EVOH") copolymer film layer and at least one inner layer located between the EVOH layer and a sealing layer. The film may have at least one further ethylene-vinyl alcohol ("EVOH") copolymer film layer separated by at least one layer from the outer layer.

BACKGROUND

Retort operations are used for thermal processing of food and sterilization of all of its primary packaging components. Food packaged in a retortable container, such as a pouch, is transferred to an autoclave where it is subjected to retort conditions including temperatures generally exceeding the boiling point of water and elevated pressures for a time period. Retortable containers, therefore, are designed to withstand retort conditions.

Ethylene-vinyl alcohol ("EVOH") copolymers are well-known for their oxygen gas barrier properties. Effectiveness of an EVOH oxygen barrier is highly dependent on relative humidity. That is, exposure to humidity results in reduced capacity of the EVOH to provide a gas barrier, which can be measured as an oxygen transmission rate (OTR). As an oxygen gas barrier, lower OTRs are desired. Providers of EVOH resins therefore typically recommend protecting EVOH-based layers from exposure to humidity. With respect to films for retortable containers, EVOH-based layers in the state of the art are provided away from an outside layer in order to suppress whitening and reduction of gas barrier properties of the EVOH-based layers.

With respect to retortable containers, an increase in OTR after exposure to report conditions is expected due to exposure of the container to wet-heat conditions. This is referred to as retort-shock. The loss in oxygen barrier/increase in OTR is, for the most part, reversible and the oxygen barrier recovers as the material dries out. EVOH containing retortable containers in the state of the art experience long retort-shock recovery times in that only after a longer period of time (days/weeks) does the oxygen barrier become fully established again.

Although there are other barrier materials such as Si Ox or LCPs (Liquid Crystal Polymer) which show no retort-shock, these materials either cannot be deep-drawn (e.g. for meal trays/containers) or are unfavorably priced.

In addition to its oxygen barrier properties in coextruded films, EVOH has excellent durability, good thermoforming performance and good appearance, which are desired features in retortable containers.

There is an on-going need to provide EVOH-containing films for packaging that provide good retort-shock recovery, a long shelf-life, a high barrier to oxygen, and optical clarity.

SUMMARY

Excellent recovery of oxygen barrier post heat processing is achieved by films and retortable containers disclosed herein.

A first aspect is a multilayer barrier film for food packaging comprising: an outer layer comprising a retortable grade ethylene vinyl alcohol (EVOH) copolymer; a sealing layer; and one or more inner layers located between the outer layer and the sealing layer. The film may further comprise an EVOH inner layer comprising a retortable grade ethylene vinyl alcohol (EVOH) copolymer, which is separated from the outer layer by at least one of the inner layers. The one or more inner layers may comprise a first inner layer comprising a polyamide that is between the outer layer and the EVOH inner layer. The one or more inner layers may comprise a second inner layer comprising a polyamide and is in direct contact with a tie layer that is in direct contact with the sealing layer. The EVOH inner layer may be in direct contact with the first and second inner layers. The sealing layer may comprise a polyolefin.

Another aspect is a multilayer barrier film for food packaging comprising: an outer layer comprising a retortable grade ethylene vinyl alcohol (EVOH) copolymer; an EVOH inner layer comprising a retortable grade ethylene vinyl alcohol (EVOH) copolymer separated from the outer layer by at least a first inner layer that is between the outer layer and the EVOH inner layer; and a sealing layer that is located on an opposite side of the EVOH inner layer from the outer layer. The first inner layer may comprise a polyamide that is between the outer layer and the EVOH inner layer. The film may further comprise a second inner layer that comprises a polyamide; is in direct contact with a tie layer that is in direct contact with the sealing layer; and is in direct contact with the EVOH inner layer. The sealing layer may comprise a polyolefin.

The multilayer barrier films of the present disclosure may be thermoformable.

One or more of the outer layer, the one or more inner layers, the EVOH inner layer, and the sealing layer may be oriented. The outer layer, the one or more inner layers, and the sealing layer may be coextruded.

Any film disclosed herein may have a thickness in the range of about 38 microns (1.5 mils) to about 1140 microns (45 mils), and all sub-ranges therebetween. Any film may have an oxygen transmission rate of less than 45 cc/m$^2$·day after a 24 hour recovery period after exposure to 121 °C steam for 30 minutes. Any film may further comprise printed indicia. The printed indicia may be located directly on the outer surface of EVOH.

A further aspect includes retortable containers comprising any multilayer barrier film of the present disclosure. The retortable container may be in the form of a pouch comprising one or more sidewalls formed from the multilayer barrier film. The retortable container may comprise a bottom web comprising a film that is thermoformed, and a top web comprising a film that is not thermoformed; wherein at least one of the bottom web and the top web comprise the multilayer barrier film.

In an aspect, a method of making a multilayer barrier film for food packaging comprises: extruding a first retortable grade ethylene vinyl alcohol (EVOH) copolymer resin through a die thereby forming an outer layer; extruding a second polymer resin through a die thereby forming a first inner layer; and extruding a third polymer resin through a die thereby forming a sealing layer.

The method may further comprise extruding a second retortable grade ethylene vinyl alcohol (EVOH) copolymer resin through a die thereby forming an EVOH inner layer located between the sealing layer and the first inner layer. The method may further comprise extruding a first tie polymer resin through a die thereby adhering the outer layer to the first inner layer. The method may further comprise extruding a fourth polymer resin through a die thereby forming a second inner layer and optionally extruding a second tie polymer resin through a die thereby adhering the sealing layer to the second inner layer.

Another aspect is a method of packaging food in a retortable container, the method comprising: obtaining any retortable container of the disclosure; packaging food in the retortable container; and exposing the retortable container to retort conditions.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. It will be understood, however, that the use of a number to refer to a component in a given figure is not intended to limit the component in another figure labeled with the same number.

DETAILED DESCRIPTION

Figure 1:
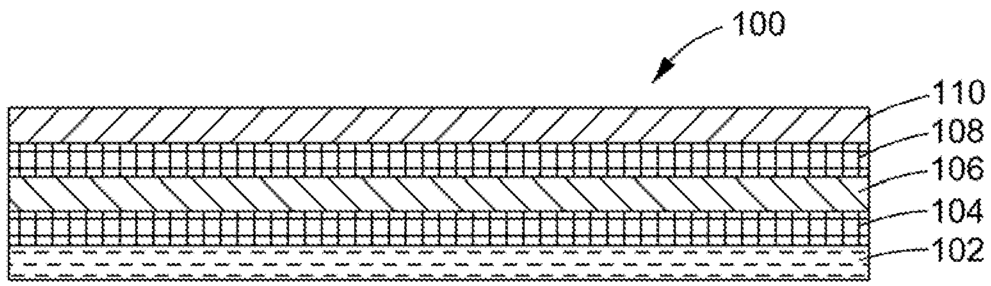
FIG. 1 is a cross-sectional view of an exemplary multilayer barrier film.

Provided are films and retortable containers that provide excellent retort-shock recovery. Providing an EVOH-based outer layer allows for low oxygen transmission rate (OTR) even shortly after exposure to retort conditions. Historically, EVOH-based layers in multilayered films have been located in positions other than the outer layer. That is, they are located adjacent the outer layer and/or are in core positions to protect the EVOH from humidity. It has been surprisingly found that putting an EVOH layer as an outer layer results in an overall film that provides an excellent oxygen barrier even shortly after exposure to retort conditions.

The following definitions are used herein.

A "layer" as used herein refers to a building block of sidewalls that is a structure of a single polymer-type or a blend of polymers or that may have an additive.

Reference to "outer layer" as used herein refers to the portion of the container that is located outermost of all the layers.

Reference to an "inner surface" means the surface of a layer away from the outer layer and towards the interior where the product is packaged.

An "inner layer" as used herein refers to a layer is that is not exposed to handling and the environment. Inner layers may provide functionality as needed for particular applications. Inner layers generally allow for thermoforming of the entire film. In addition, inner layers may provide barrier protection and/or structural strength. An exemplary inner layer is a barrier layer, which provides protection to packaged food for freshness and/or a barrier to moisture and/or oxygen. Barrier layers may also protect EVOH layers from migration from package contents (for example, oils and the like). An exemplary inner layer may also be a structural layer, which provides one or more of: general durability, puncture strength, resistance to curling, and flex crack resistance.

A "sealing layer" is one that seals to itself to form a hermetic seal. That is, the sealing layer comprises a thermoplastic polymer or polymer mixture that softens when exposed to heat and returns to its original condition when cooled to room temperature.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "copolymer" refers to polymers formed by the polymerization of reaction of at least two different monomers. As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer.

As used herein, terminology employing a "/" with respect to the chemical identity of a copolymer (e.g., ethylene/vinyl alcohol copolymer), identifies the comonomers that are copolymerized to produce the copolymer.

As used herein, the term "polyester" refers to homopolymers or copolymers having an ester linkage between monomer units which may be formed, for example, by condensation polymerization reactions between a dicarboxylic acid and a glycol. The ester can be represented by the general formula: $[R—C(O)O—R']_n$ Where R and R'=alkyl group and may be generally formed from the polymerization of dicarboxylic add and diol monomers or monomers containing both carboxylic acid and hydroxy moieties.

As used herein, "EVOH" refers to ethylene vinyl alcohol copolymer. EVOH is otherwise known as saponified or hydrolyzed ethylene vinyl acetate copolymer, and refers to a vinyl alcohol copolymer having an ethylene comonomer. EVOH is prepared by the hydrolysis (or saponification) of an ethylene-vinyl acetate copolymer. The degree of hydrolysis is preferably from about 50 to 100 mole percent, more preferably from about 85 to 100 mole percent, and most preferably at least 97%. It is well known that to be a highly effective oxygen barrier, the hydrolysis-saponification must be nearly complete, i.e., to the extent of at least 97%. EVOH is commercially available in resin form with various percentages of ethylene and there is a direct relationship between ethylene content and melting point. For example, EVOH having a melting point of about 175 °C or lower is characteristic of EVOH materials having an ethylene content of about 38 mole percent or higher. EVOH having an ethylene content of 38 mole percent has a melting point of about 175 °C With increasing ethylene content, the melting point is lowered. A melting point of about 158 °C corresponds to an ethylene content of 48 mole percent. EVOH copolymers having lower or higher ethylene contents may also be employed. It is expected that processability and orientation would be facilitated at higher contents; however, gas permeabilities, particularly with respect to oxygen, may become undesirably high for certain packaging applications which are sensitive to microbial growth in the presence of oxygen. Conversely, lower contents may have lower gas permeabilities, but processability and orientation may be more difficult. Preferably, ethylene/vinyl alcohol copolymers comprise from about 27-38 mole % ethylene, or even 27-29 mole % ethylene.

Reference to "retortable grade" EVOH copolymer is an EVOH that does not melt or otherwise degrade under "retort conditions", which are exposure to high temperature steam or superheated water at ~120 °C±5 °C for about 30 to 60 minutes.

The term "tie layer," "adhesive layer," or "adhesive coating," refers to a material placed on one or more layers, partially or entirely, to promote the adhesion of that layer to another surface. Preferably, adhesive layers or coatings are positioned between two layers of a multilayer film to maintain the two layers in position relative to each other and prevent undesirable delamination. Unless otherwise indicated, a tie layer or an adhesive layer or coating can have any suitable composition that provides a desired level of adhesion with the one or more surfaces in contact with the adhesive layer material. Optionally, a tie layer or an adhesive layer or coating placed between a first layer and a second layer in a multilayer film may comprise components of both the first layer and the second layer to promote simultaneous adhesion of the adhesive layer to both the first layer and the second layer to opposite sides of the adhesive layer.

A "sidewall" is a discrete piece of polymer film or multi-layer laminate that is sealed to itself or another sidewall by, for example, welding or an adhesive, to form a pouch or a bag.

Films

The multilayer films, as well as containers having such films, preferably have seal strength, stability, heat resistance, and oxygen and water vapor transmission properties that allow them to be subjected to retort conditions without loss of desired functional characteristics. The films disclosed herein may also be used for pasteurization purposes.

For example, after exposure to retort conditions, a seal strength is generally from about 10 N/15 mm (3.8 lb/in) to about 200 N/15 mm (75 lb/in), and typically from about 40 N/15 mm (15 lb/in) to about 80 N/15 mm (30 lb/in), according to ASTM-F88 with a crosshead speed of 2.12 cm/sec (5 in/min). Advantageously, high seal strength stability of the container is also exhibited, based on a loss in seal strength of generally less than about 35%, typically less than about 20%, and often less than about 10%, upon being subjected to retort conditions. Furthermore, multilayer films described herein also have acceptable heat resistance, in terms of not undergoing delamination. Preferably, no delamination of the film structure is observed after the film is subjected to 100 °C (212 °F) for 30 minutes, or even for 60 minutes. Further properties of representative films include a barrier-oxygen transmission rate of generally from about 0.16 cc/m$^2$/day (0.01 cc/100 in$^2$/day) to about 62 cc/m$^2$/day (4 cc/100 in$^2$/day), and typically from about 0.16 cc/m$^2$/day (0.01 cc/100 in$^2$/day) to about 1.6 cc/m$^2$/day (0.1 cc/100 in$^2$/day) at a temperature of 23 °C (73 °F), and/or a barrier-water vapor transmission rate of generally from about 0.47 g/m$^2$/day (0.03 g/100 in$^2$/day) to about 7.8 g/m$^2$/day (0.5 g/100 in$^2$/day), and typically from about 0.47 g/m$^2$/day (0.03 g/100 in$^2$/day) to about 3.9 cc/m$^2$/day (0.25 g/100 in$^2$/day) at a temperature of 100 °C (212 °F) and 90% relative humidity.

Representative multilayer films are also in compliance with regulations set forth under 21 C.F.R. § 177.1390, hereby incorporated by reference.

For retort purposes, in general, the films disclosed herein do not include any film layer having a melting temperature of less than about 90 °C (194 °F), typically they do not include any film layer having a melting temperature of less than about 100 °C (212 °F), and often they do not include any film layer having a melting temperature of less than about 110 °C (230 °F). The films disclosed herein may be used for pasteurization purposes, whose conditions are typically less than 100 °C (212 °F), in which case, the film layers may have correspondingly lower melting temperatures.

The total thickness of a representative, multilayer film, as described herein, which may be used in the formation of retortable containers is generally from about 38 microns (1.5 mils) to about 1140 microns (45 mils), or from about 51 μm (2 mils) to about 380 μm (15 mils), and typically from about 74 μm (2.9 mils) to about 150 μm (6 mils).

Materials

The multilayer film comprises an outer layer, which upon formation of a container is disposed furthest from the container contents. The thickness of the outer layer is generally from about 1 μm (0.039 mils) to about 100 μm (3.9 mils), and typically from about 7.5 μm (0.30 mils) to about 25 μm (0.98 mils). The outer layer comprises a retortable grade ethylene vinyl alcohol (EVOH). An exemplary EVOH is SoarnoL™ RB7405 (Soarus), which is a retortable grade EVOH having 29% ethylene. In one or more embodiments, the outer layer comprises >97% to 100% EVOH. The outer layer may comprise 100% EVOH.

The sealing layer of the multilayer film generally refers to the innermost layer that is exposed to the internal contents of the container, such as food. The sealing layer may be used for forming pouches in which case the sealing layer bonds to itself, normally by heat sealing. Also, the sealing layer may be used for bonding, at adjacent bonding surfaces, with a base material to form a peripheral seal, normally by heat sealing. The base material may be a rigid or flexible container bottom, for example comprising polypropylene or polyethylene. The base material may also be a second multilayer film of the same type or of a different type as the multilayer film. For example, in embodiments in which the retortable container is formed by folding a multilayer film upon itself and heat sealing the overlapping edges, the multilayer film and base material are necessarily the same, as are their adjacent sealing layers. In general, the sealing layer may comprise any suitable thermoplastic material including, but not limited too, synthetic polymers such as polyesters, polyamides, polyolefins, polystyrenes, and the like. Thermoplastic materials may also include any synthetic polymers that are cross-linked by either radiation or chemical reaction during a manufacturing or post-manufacturing process operation. Exemplary polyolefins include polyethylene (PE) and polypropylene (PP).

A preferred sealing layer comprises (e.g., in a major amount of greater than 50% by weight), or consists essentially of (1) a polypropylene or (ii) a blend of polypropylene and at least one other polyolefin. Polyolefins include polyolefin plastomers, such as, for example polyethylene that may be blended in the sealing layer. The sealing layer may also comprise (e.g., in a major amount of greater than 50% by weight), or consist essentially of (i) a cast retortable grade polypropylene (ii) a coextruded polypropylene polymer or copolymer, or (iii) a blend of a coextruded polypropylene polymer or copolymer and at least one other polyolefin. In one particular embodiment, the sealing layer comprises 100% by weight of cast retortable grade polypropylene. A particular, representative cast retortable grade polypropylene has a density of about 0.9 g/cm$^3$ (e.g., in the range from about 0.85 g/cm$^3$ to about 0.95 g/cm$^3$) and melt flow index of 2.1 g/10 min (e.g., in the range from about 1.9 g/10 min to about 2.3 g/10 min), such as, for example, KAP High Performance CPP (Amcor Flexibles Venturina S.r.I., Campiglia Marittima, Italy).

The thickness of the sealing layer is generally from about 10 μm (0.39 mils) to about 500 μm (20 mils), and typically from about 50 μm (2 mils) to about 200 μm (7.9 mils).

One or more inner layers are located between the outer layer and the sealing layer. The inner layers may provide barrier protection and/or structural strength to the film. Inner layers generally allow for thermoforming of the entire film. A representative inner layer comprises (e.g., in a major amount of greater than 50% by weight), or consists essentially of, a nylon-based polymer or copolymer. A suitable nylon copolymer is "Ultramid® C40" which is a copolymer PA6/66 (BASF).

Between any of the layers, a tie layer or an adhesive coating or layer may be provided to provide adhesion and continuity between the layers. Adhesive resin compositions invention may include, but are not limited to: modified and unmodified polyolefins, preferably modified polypropylene including an anhydride group, modified and unmodified acrylate resin, preferably selected from the group consisting of ethylene/vinyl acrylate copolymer, ethylene/ethyl acrylate copolymer, ethylene/butyl acrylate copolymer, or blends thereof. EVA is an ethylene/vinyl acetate co-polymer, which may be used in particular to form a layer to facilitate bonding of polymerically dissimilar layers.

The tie layer or adhesive coating may suitably be less than 10% and preferably between 2% and 10% of the overall thickness of the multilayer film. Adhesive resins are often more expensive than other polymers so the tie layer thickness is usually kept to a minimum consistent with the desired effect.

Fabrication

An exemplary multi-layered film may be formed by extruding a first retortable grade ethylene vinyl alcohol (EVOH) copolymer resin through a die thereby forming an outer layer; extruding a second polymer resin through a die thereby forming a first inner layer; extruding a third polymer resin through a die thereby forming a sealing layer.

In one or more embodiments, a second retortable grade ethylene vinyl alcohol (EVOH) copolymer resin may be extruded through a die to form an EVOH inner layer located between the sealing layer and the first inner layer.

The method may further comprise extruding a first tie polymer resin through a die thereby adhering the outer layer to the first inner layer.

The method may further comprise extruding a fourth polymer resin through a die thereby forming a second inner layer and optionally extruding a second tie polymer resin through a die thereby adhering the sealing layer to the second inner layer.

To form a package, a sealing layer of any film disclosed herein is adhered to itself or another film to form a seam of a sidewall. Packages may further include indicia in their films.

Before describing several exemplary embodiments of the invention, it is to be understood that the invention is not limited to the details of construction or process steps set forth in the following description. The invention is capable of other embodiments and of being practiced or being carried out in various ways.

Figure 2:
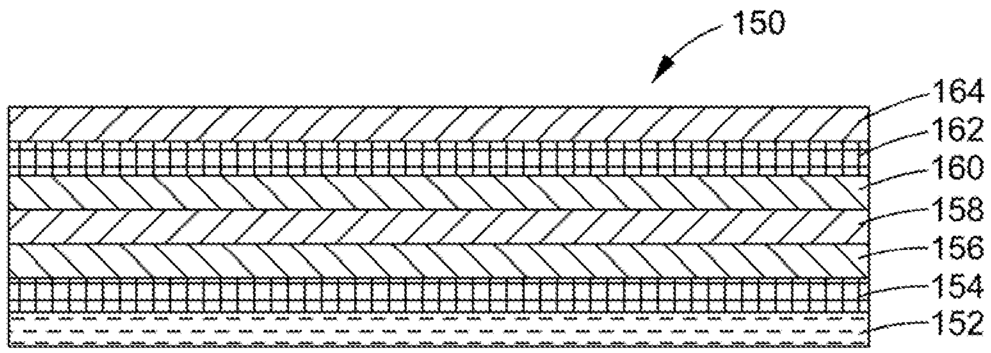
FIG. 2 is a cross-sectional view of another exemplary multilayer barrier film.
Figure 3:
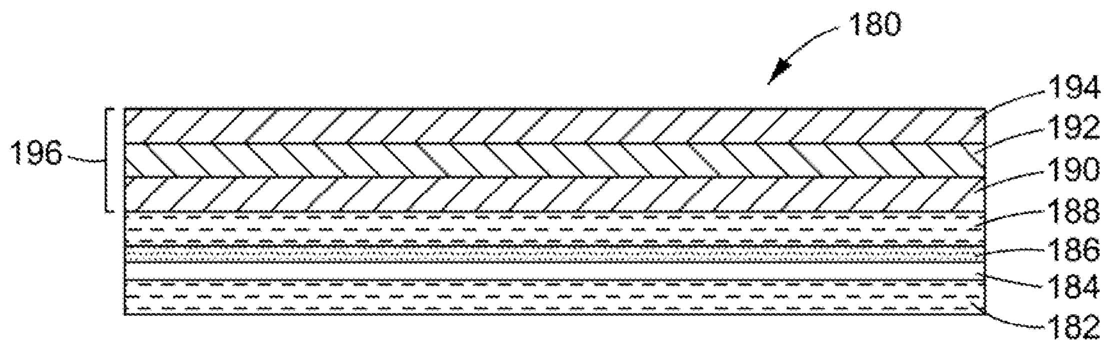
FIG. 3 is a cross-sectional view of another exemplary multilayer barrier film.

Turning to the figures, FIG. 1 is a cross-sectional view of an exemplary multilayer barrier film 100 having 5-layers. In order, the layers are: an outer layer 110 of EVOH, a first tie layer 108, for example of modified polyolefin, an inner layer 106 of nylon polymer or copolymer, a second tie layer 104, for example of modified polyolefin independent of the first tie layer 108, and a sealing layer 102 of an olefin, preferably polypropylene. A cross-sectional view of another exemplary multilayer barrier film 150 is provided in FIG. 2, which is a 7-layer film. In order, the layers are: an outer layer 164 of EVOH, a first tie layer 162, for example of modified polyolefin, a first inner layer 160 of nylon polymer or copolymer, an EVOH inner layer 158, a second inner layer 156 of nylon polymer or copolymer independent of the first inner layer 160, a second tie layer 154, for example of modified polyolefin independent of the first tie layer 162, and a sealing layer 152 of an olefin, preferably polypropylene. In FIG. 3, a cross-sectional view of another exemplary multilayer barrier film 180 having 8-layers is shown. The layers in order are: an outer layer 194 of EVOH, a first inner layer 192 of nylon polymer or copolymer, an EVOH inner layer 190, a second inner layer 188 of a polyolefin, an adhesive layer 186, an ink layer 184 comprising indicia, and a sealing layer 182 of an olefin, preferably cast polypropylene. The outer layer 194, the first inner layer 192, and the EVOH inner layer 190 may first be formed into a structure 196 by co-extrusion, preferably machine-direction oriented, and then separately coated with the second inner layer 188. Adhesive layer 186 is applied in an adhesive lamination process to bond to the sealing layer 182 which has been previously printed with ink layer 184. While the foregoing examples include 5-, or 7-, or 8-layers, it is understood that films of the present disclosure may include as few as 3-layers (outer layer of retortable EVOH, inner layer, sealing layer) and any number of additional layers as desired for a particular application.

Figure 4:
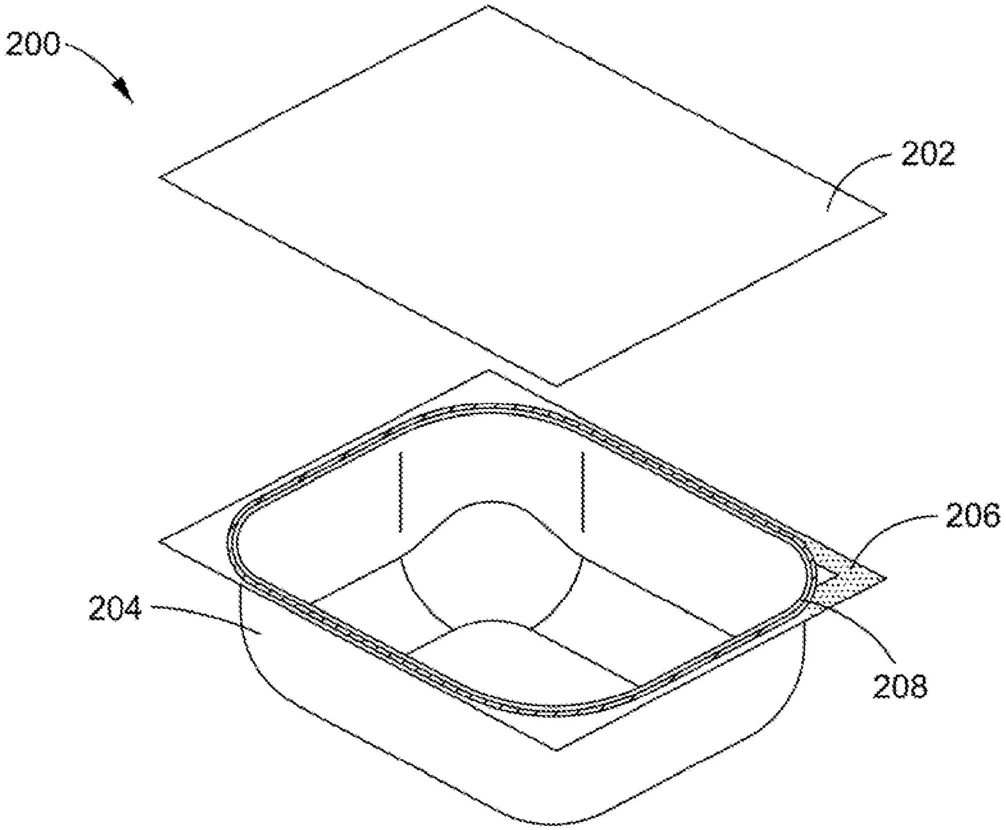
FIG. 4 is an exploded perspective view of an exemplary retortable container.

FIG. 4 is an exploded perspective view of an exemplary retortable container 200 having a top web 202 and a bottom web 204. The top web 202 is according to any multilayer barrier film of the disclosure, which has an outer layer of retortable EVOH. A sealing layer (not numbered) of the top web 202 is heat-sealed to a sealing surface 206 of the bottom web 204, which is made of a film that may be the same or different as that of the top web 202. The bottom web 204 is preferably thermoformed and the top web 202 may be thermoformed, otherwise formed, or may be unformed.

Figure 5:
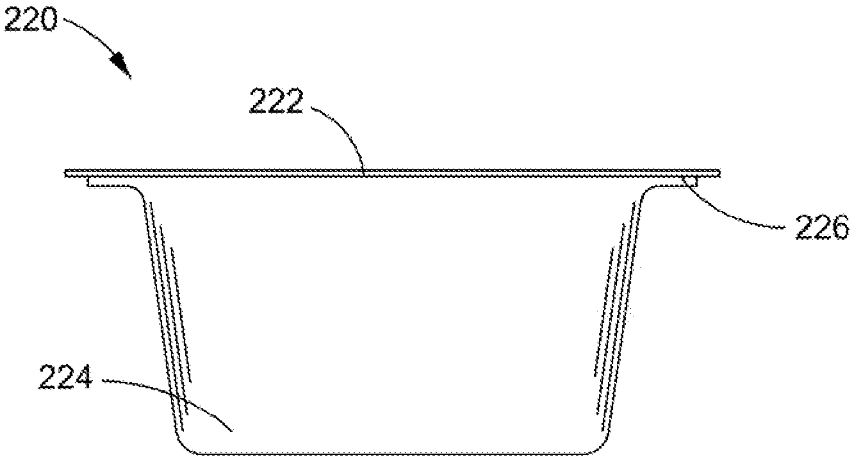
FIG. 5 is a plan view of an exemplary retortable container.

FIG. 5 is a plan view of an exemplary retortable container 220 having a top web 222 and a bottom web 224. The bottom web 224 is according to any multilayer barrier film of the disclosure, which has an outer layer of retortable EVOH. The bottom web 224 is preferably thermoformed. The top web 222 is heat-sealed to a sealing surface 226 of the bottom web 224. The top web 222 is made of a film that may be the same or different as that of the bottom web 224. The top web 222 may be thermoformed, otherwise formed, or unformed.

Figure 6:
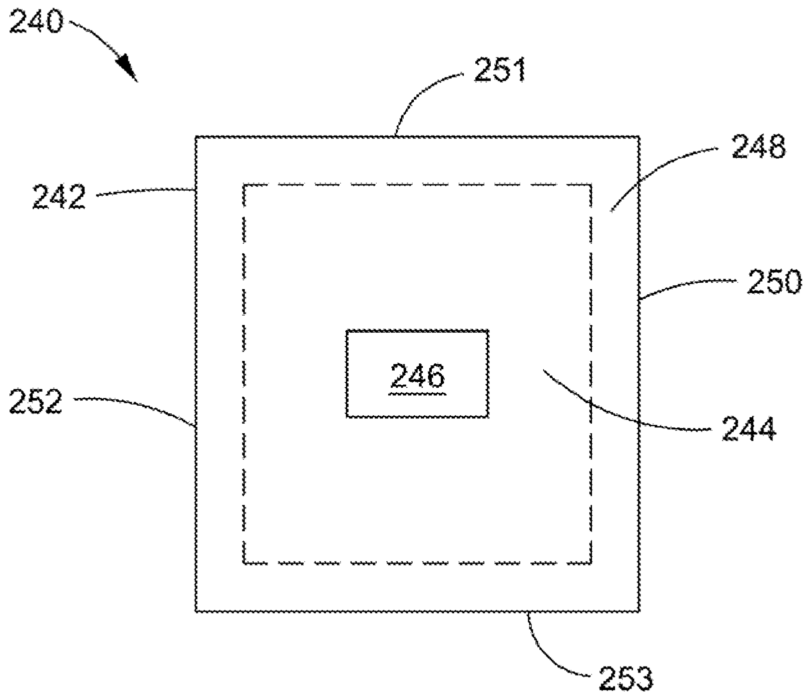
FIG. 6 is a plan view of an exemplary retortable container.

FIG. 6 is a plan view of an exemplary retortable container in the form of a package 240, which includes a product 246, such as a pharmaceutical or food product, sealed within an interior 244 of the package 240 that includes any multilayer barrier film 242 of the disclosure. The product 246 is in contact with the sealing layer (not numbered) of the film 242. In some embodiments, the package 240 consists essentially of the film 242. The film 242 forms the interior 244 of the package 240 which is defined by heat seal 248 that is formed along each edge 250, 251, 252, 253 of the package. In the depicted embodiment, the dashed lines indicate the sealed portion of the package 240 that defines sealed interior 244.

Figure 7:
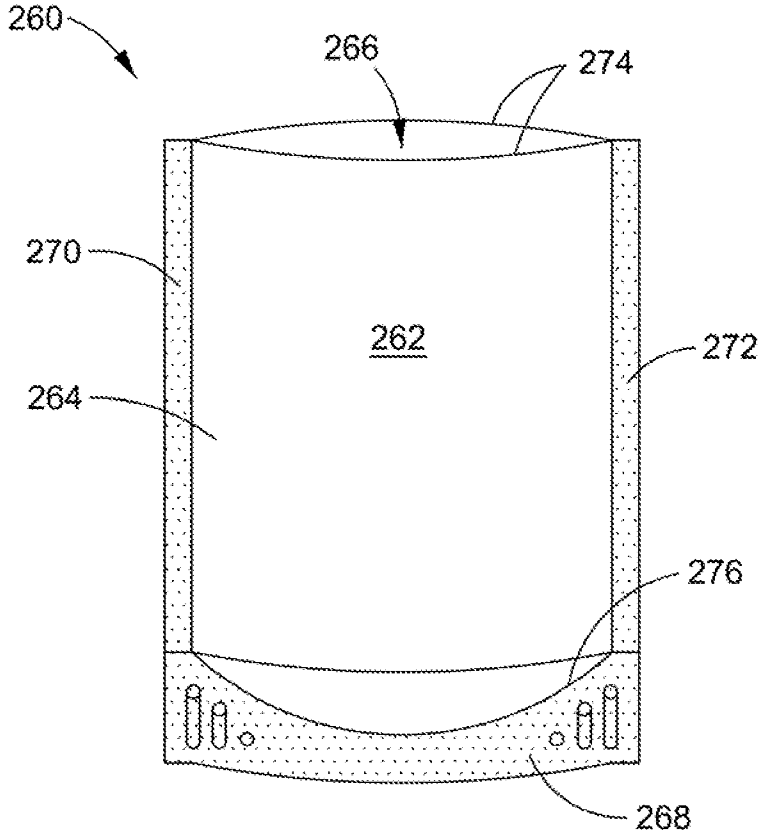
FIG. 7 is a schematic side view of an exemplary retortable container.

FIG. 7 is a schematic side view of an exemplary retortable container in the form of a stand up pouch 260, which may be suitable for liquid packaging. Pouch 260 comprises a sidewall 264, an opening 266 and bottom gusset 268 formed from any film 262 of the disclosure. The film 262 is heat-sealed to form side seals 270, 272 and a bottom seal 276. After filling, edges 274 are heat sealed to form a top seal.

Figure 8:
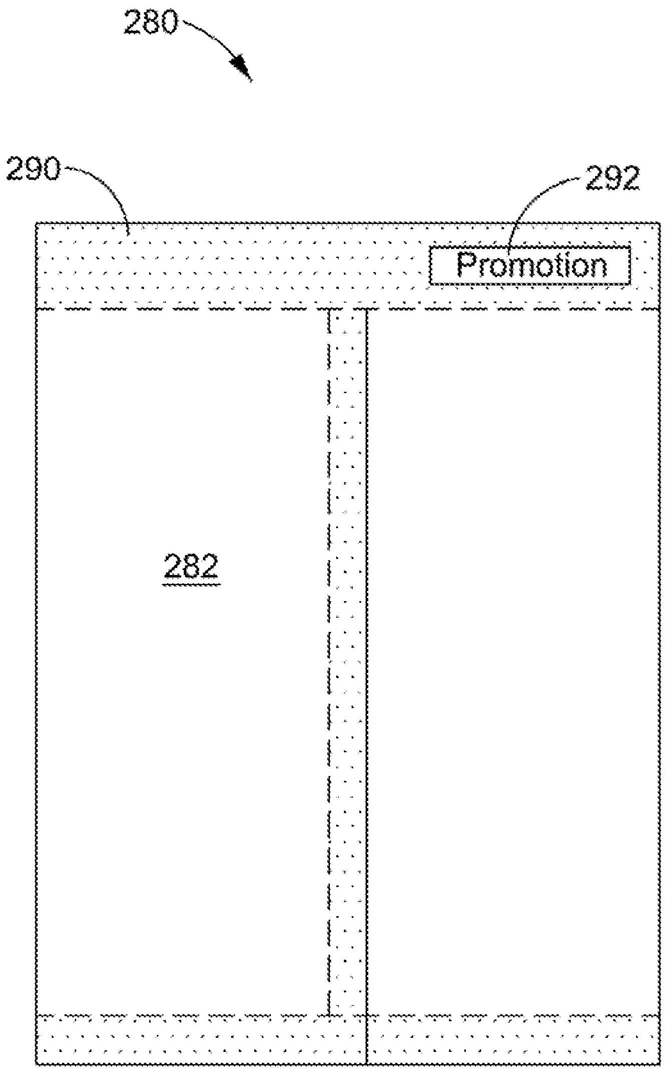
FIG. 8 is a plan view of an exemplary retortable container.

FIG. 8 is a plan view of another exemplary retortable container in the form of a pouch 280, which may be suitable for liquid packaging. Pouch 280 comprises a sidewall 284 formed from any film 282 of the disclosure. The film 282 is heat-sealed to form seals 290. Indicia 292 may be provided as part of the film 282 at any suitable location including a location between a sealing layer and an outer layer of EVOH of the film 282. Alternatively, the indicia 292 may be printed directly on the outer layer of EVOH.

EXAMPLES

Example 1

Two asymmetric EVOH-based barrier films were manufactured by blown film coextrusion techniques having the following structure in order:

Outer layer: ethylene vinyl alcohol (EVOH) copolymer (29%). Trade name: SoarnoL™ RB7405 (Soarus)—ETHYLENE VINYL ALCOHOL COPOLYMER (EVOH), Retortable Grade.

First tie layer: Adhesive to retort including blend consisting of anhydride. Trade name: ADMER™ QF551A (Mitsui).

First inner layer: polyamide, nylon 6.66. Trade name: Ultramid® C40 (BASF) which is a copolymer PA6/66.

EVOH inner layer: ethylene vinyl alcohol (EVOH) copolymer (29%). Trade name: SoarnoL™ RB7405 (Soarus).

Second inner layer: polyamide, nylon 6.66. Trade name: Ultramid® C40 (BASF).

Second tie layer: Adhesive to retort including blend consisting of anhydride. Trade name: ADMER™ QF551A (Mitsui).

Sealing layer: Blend of polypropylene (PP) materials. Trade names: PP copolymer random PRB 0131 (Braskem), Plastomer based PP Versify 3300 (DOW).

This structure is abbreviated as: EVOH/tie/PA/EVOH/PA/tie/PP (blown).

Example 2

Comparative

Two asymmetric standard/comparative retort film were these films manufactured for this experiment by blown film extrusion followed by rapid quenching, as is known in the art, having the following structure in order:

Outer layer: Nylon 6. polyamide. Trade name: Ultramid® B36 (BASF).

First tie layer: Adhesive to retort including blend consisting of anhydride. Trade name: ADMER™ QF551A (Mitsui).

First inner layer: Nylon 6. polyamide. Trade name: Ultramid® B36 (BASF).

EVOH inner layer: ethylene vinyl alcohol (EVOH) copolymer 29%). Trade name: SoarnoL™ RB7405.

Second inner layer: Nylon 6. polyamide. Trade name: Ultramid® B36 (BASF).

Second tie layer: Adhesive to retort including blend consisting of anhydride. Trade name: ADMER™ QF551A (Mitsui).

Sealing layer: Blend of polypropylene (PP) materials. Trade names: PP copolymer random PRB 0131 (Braskem), Plastomer based PP Versify 3300 (DOW).

This structure abbreviated as: PA/tie/PA/EVOH/PA/tie/PP (ICE).

Example 3

Testing

Figure 9:
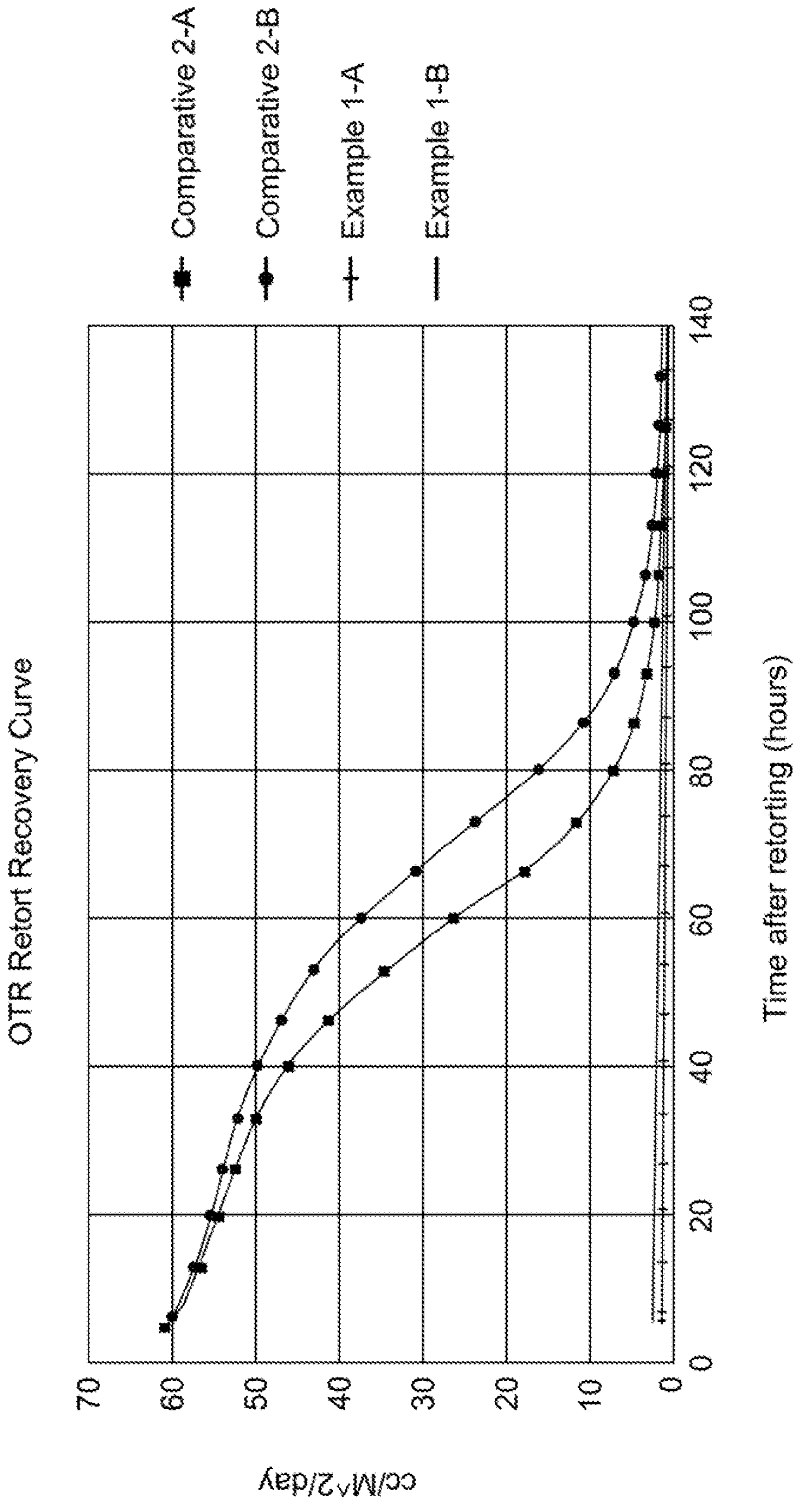
FIG. 9 is a graph of oxygen transmission rate (OTR) versus time for exemplary films and comparative films.

Oxygen barrier performance of the films of Example 1 (1-A and 1-B) and of Comparative Example 2 (2-A and 2-B) were compared after exposure to retort conditions of 121 °C steam for 30 minutes. FIG. 9 provides a graph of oxygen transmission rate (OTR) cc/100 $m^2$·day versus time from the conclusion of retort conditions (recovery curves) that were generated for the films.

The recovery curves for Comparative Examples 2-A and 2-B show high OTR initially after the conclusion of retort conditions, where the OTR gradually approaches 0 cc/100 $m^2$·day after 100 hours. In contrast, Examples 1-A and 1-B show a low OTR initially after the conclusion of retort conditions (<0.1 cc/100 $in^2$·day) that then approaches 0 cc/100 $m^2$·day after 100 hours. The recovery curves for films having EVOH as an exterior layer show that retort shock is improved by allowing the film to dry more rapidly. While any morphological differences due to manufacturing techniques (air quench versus rapid quench) may have resulted in some differences in the total permeability, the inventive film structure resulted in a dramatic improvement in terms of reducing retort shock.

Unless otherwise indicated, all numbers expressing quantities of ingredients, properties such as molecular weight, reaction conditions, and so forth used in the specification and claims are to be understood as being modified in ail instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A multilayer barrier film for food packaging comprising:

an outer layer comprising 97% to 100%, by weight, of a retortable grade ethylene vinyl alcohol (EVOH) copolymer;

a sealing layer;

an EVOH inner layer comprising a retortable grade ethylene vinyl alcohol (EVOH) copolymer; a first inner layer comprising a polyamide that is between the outer layer and the EVOH inner layer; and a second inner layer comprising a polyamide the second inner layer being in direct contact with a tie layer that is in direct contact with the sealing layer, wherein the EVOH inner layer is in direct contact with the first and second inner layers;

wherein the multilayer barrier film is not oriented; and wherein the multilayer barrier film exhibits retort-shock recovery characterized by an oxygen transmission rate of less than 45 cc/m$^2$/day after exposure to 121 °C steam for 30 minutes and a 24-hour recovery period.

2. The multilayer barrier film of claim 1 having a thickness in the range of about 38 microns (1.5 mils) to about 1140 microns (45 mils).

3. The multilayer barrier film of claim 1 further comprising printed indicia located directly on the outer surface.

4. The multilayer barrier film of claim 1, wherein the sealing layer comprises a polyolefin.

5. The multilayer barrier film of claim 1 that is thermoformable.

6. The multilayer barrier film of claim 1, wherein the outer layer, the EVOH inner layer, the first inner layer, and the sealing layer are coextruded.

7. A retortable container comprising the multilayer barrier film of claim 1.

8. The retortable container of claim 7 in the form of a pouch comprising one or more sidewalls formed from the multilayer barrier film.

9. A multilayer barrier film for food packaging comprising:

an unoriented outer layer comprising a retortable grade ethylene vinyl alcohol (EVOH) copolymer;

a sealing layer;

an EVOH inner layer comprising a retortable grade ethylene vinyl alcohol (EVOH) copolymer;

a first inner layer comprising a polyamide that is between the outer layer and the EVOH inner layer;

and a second inner layer comprising a polyamide and being in direct contact with a tie layer that is in direct contact with the sealing layer, wherein the EVOH inner layer is in direct contact with the first and second inner layers;

the outer layer, the sealing layer, the EVOH inner layer, the first inner layer, the second inner layer and the tie layer are not oriented; and wherein the multilayer barrier film is printable and retains print integrity after retort processing.

10. The multilayer barrier film of claim 1 wherein the outer layer comprises 100%, by weight, of the retortable grade ethylene vinyl alcohol (EVOH) copolymer.

* * * * *